May 28, 1940.  A. E. OZOUF  2,202,022
APPARATUS FOR USE IN COATING CARCASSES
Filed Nov. 18, 1937  5 Sheets-Sheet 3

Inventor
Arthur E. Ozouf
By Fred Gerlach
his Atty.

May 28, 1940.  A. E. OZOUF  2,202,022

APPARATUS FOR USE IN COATING CARCASSES

Filed Nov. 18, 1937  5 Sheets-Sheet 4

Inventor
Arthur E. Ozouf
By Fred Gerlach his Atty

May 28, 1940. A. E. OZOUF 2,202,022
APPARATUS FOR USE IN COATING CARCASSES
Filed Nov. 18, 1937 5 Sheets-Sheet 5

Patented May 28, 1940

2,202,022

UNITED STATES PATENT OFFICE 2,202,022

APPARATUS FOR USE IN COATING CARCASSES

Arthur E. Ozouf, Chicago, Ill., assignor to The Allbright-Nell Co., Chicago, Ill., a corporation of Illinois Application November 18, 1937, Serial No. 175,290

14 Claims. (Cl. 17—11.1)

The present invention relates generally to apparatus for use in connection with the application of melted readily congealable material to machine dehaired hog carcasses to form seal-like coatings which upon stripping or peeling from the carcasses effect removal of the hair and roots remaining after the machine dehairing operation as well as the removal of glandular secretions and other undesirable matter from the skin portions of the carcasses. More particularly the invention relates to that type of coating applying apparatus which is adapted for use in a combined slaughtering and packing house with an overhead rail for conveying the carcasses by way of gambrel supporting trolleys from the dehairing machine to either a polishing machine or the carcass cutting and inspection line and comprises a material-containing tank in the floor of the combined slaughtering and packing house and beneath the overhead rail, and in addition a dipping mechanism which embodies a motor driven endless conveyor in an interruption or cut-out in the portion of the overhead rail above the tank and operates during drive of the conveyor to remove the carcasses, one at a time, from the preceding section of the rail, that is, the section between it and the dehairing machine or the usual gambrel applying table at the discharge end of the dehairing machine, then to lower the carcasses into the material in the tank for coating purposes, and finally to elevate the carcasses and transfer or place them on the following section of the rail for travel past the coating stripping point to the polishing machine or cutting and inspection line.

One object of the invention is to provide an apparatus of this type which in addition to the tank and dipping mechanism comprises means for melting the stripped coatings and effecting removal of the hair and other debris from the melted material and also means for delivering the material from such means back to the dipping tank so that it is available for use in connection with the coating of other carcasses.

Another object of the invention is to provide a carcass coating apparatus of the last mentioned character in which the means for melting the stripped coatings and effecting removal of the hair and other debris from the melted material comprises (1) a remelting tank which is adapted to receive the coatings immediately after stripping or peeling from the carcasses and remelt the material and has a power driven agitator therein for liberating the moisture accompanying the coatings and preventing the mass of material from bubbling over during remelting thereof, and (2) a reclaiming tank which is connected to receive the remelted material from the remelting tank and has simple and novel means for effecting removal of the hair and other debris from such material.

Another object of the invention is to provide a carcass coating apparatus of the aforementioned type and character which embodies a novel arrangement for maintaining the material in the dipping tank at a fixed or predetermined level at all times to the end that the carcasses acquire uniform seal-like coatings during the dipping operation.

A further object of the invention is to provide a carcass coating apparatus which is efficient in operation as well as practical and fulfills its intended purpose with but a minimum loss of the coating material.

Other objects of the invention and the various advantages and characteristics of the present carcass coating apparatus will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views.

Figure 1:
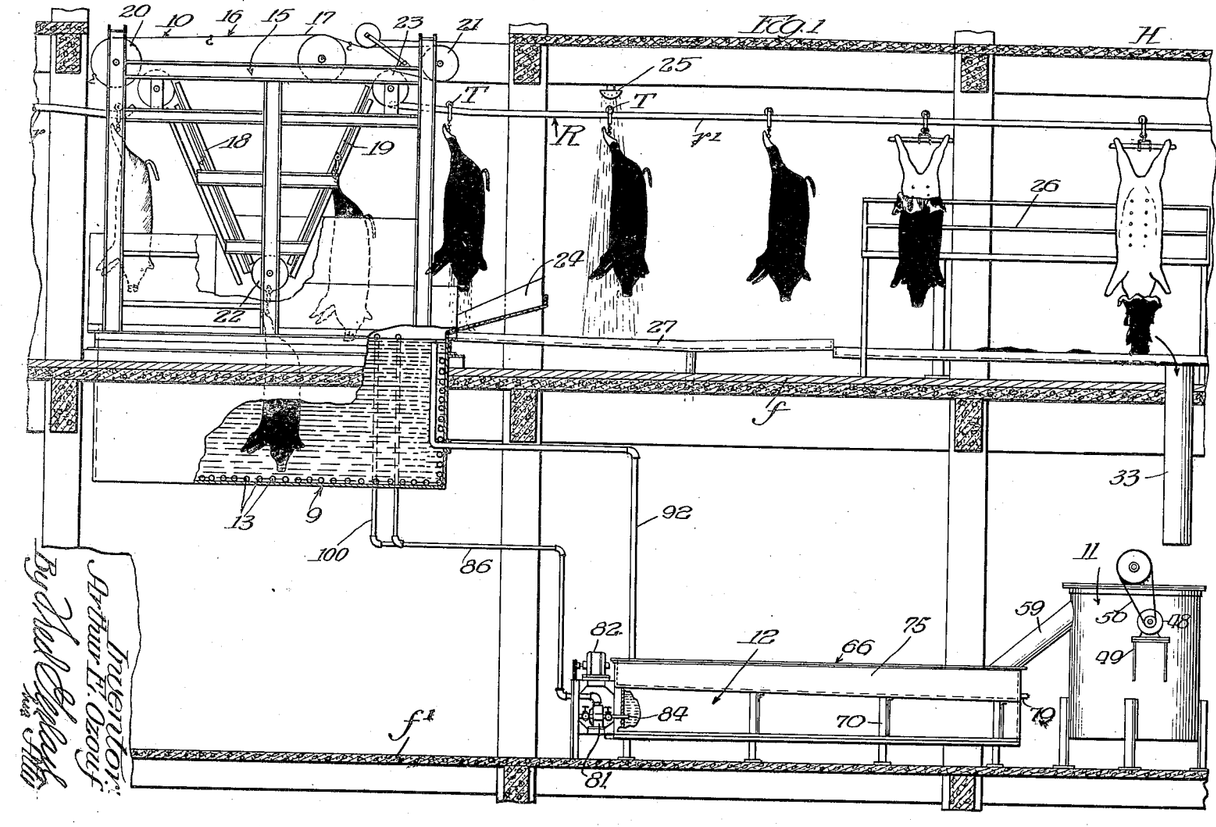
Figure 1 is a view partly in section and partly in side elevation showing a two floor carcass coating apparatus constituting one form of the invention.

The apparatus which is shown in Figures 1 to 7, inclusive, constitutes one embodiment of the invention. It is designed for use in connection with a combined slaughtering and packing house H having a main floor $f$ with an overhead rail R thereabove and a sub-floor $f^1$ beneath the main floor and is adapted for use in connection with the application of melted resinous material to machine dehaired hog carcasses in order to form seal-like coatings which when stripped or peeled from the carcasses remove the hair and roots remaining after the machine dehairing operation and also effect removal of various glandular secretions and other undesirable material from the skin portions of the carcasses. Primarily the apparatus under consideration is adapted for use in connection with the method or process which forms the subject matter of United States Letters Patent No. 2,100,299, granted November 23, 1937, to Frederick M. Tobin. The overhead rail R is supported beneath the ceiling over the main floor $f$ of the combined slaughtering and packing house H and is adapted to support the carcasses in a depending inverted position by way of gambrel-equipped trolleys T. It has an interruption or cut-out, as shown in Figure 1, and comprises a preceding rail section $r$ and a following rail section $r^1$. The rail section $r$ leads from the carcass dehairing machine (not shown) or the usual gambrel applying table at the discharge end of the dehairing machine to the cut-out and the following rail section $r^1$ leads from such cut-out to a polishing machine (also not shown) in front of the usual cutting and inspection line.

The apparatus of Figures 1 to 7, inclusive, comprises as the main parts thereof a dipping tank 9, a carcass dipping mechanism 10, a remelting tank 11, and a reclaiming tank 12.

The dipping tank 9 is suitably supported in an opening in the main floor $f$ of the building H and is located directly beneath the cut-out in the rail R. It is adapted to hold a column or mass of resinous coating material for the hog carcasses and has a plurality of steam pipes 13 therein. The latter are located in close proximity to the walls of the tank and serve to maintain the adhesive material in a melted condition at a temperature of approximately 300° F. The material is preferably in the form of a compound of resin or pitch and a small amount of soy bean oil or equivalent material.

The carcass dipping mechanism 10 is disposed directly over the dipping tank 9. It corresponds in design and construction to that which forms the subject matter of an application for United States Letters Patent serial No. 172,907, filed by me November 5, 1937, and comprises a frame 15 and an endless conveyor 16. The frame is fabricated of channel bars and embodies a pair of laterally spaced sides which extend parallel to the rail R. The conveyor 16 is disposed between the sides of the frame and embodies a substantially horizontally extending top reach 17, a downwardly extending reach 18, and an upwardly extending reach 19. It is preferably in the form of a pair of laterally spaced chains with hook equipped cross-shafts between the two chains and is driven by an electric motor and speed reducing gearing (not shown). The upper reach 17 of the conveyor is disposed slightly above the rail R and is supported at its ends by chain engaging front sprockets 20 and chain engaging rear sprockets 21. The downwardly inclined reach 18 extends in the direction of the tank 9 and slightly rearwards and is supported at its lower end by chain engaging sprockets 22 at the bottom portion of the frame 15. The upwardly extending reach 19 projects upward and rearwards from the sprockets 22 and extends over a pair of idler sprockets 23 and thence rearwards to the rear sprockets 21. The hog carcasses, after machine dehairing thereof, are connected to the trolleys T by way of the gambrels. Thereafter they are moved one at a time along the rail section $r$ to the dipping mechanism 10. When the carcasses reach the discharge end of the rail section $r$, that is, the end adjacent to the mechanism 10, wads of cotton or like material are inserted into the nostrils for plugging purposes and rubber bands are placed around the snouts in order to hold the jaws together. During drive of the endless conveyor the hooks on the cross-shafts are adapted as they pass around the front chain engaging sprockets 20 to be brought into hooked relation with the frames of the trolleys T. During travel of the hook equipped shafts in the downwardly extending reach 18 of the conveyor, the hog carcasses with the nostrils thereof plugged and the snouts clamped by the rubber band are first removed from the discharge end of the preceding rail section $r$ and then lowered into the resinous coating material in the tank 9. As the carcasses pass around the sprockets 22 they become substantially completely immersed in the material and acquire a seal-like adhesive coating. During travel of the hook-equipped shafts of the conveyor in the upwardly extending reach 19 the hog carcasses are elevated or withdrawn from the tank 9. At the upper end of the reach 19 the trolleys T are placed on the receiving end of the following rail section $r^1$, as shown in Figure 1. The sprockets 22 are so positioned that the hogs are completely immersed in the resinous material in the tank with the exception of the extremities of the hocks. Beneath the receiving end of the rail section $r^1$ is a drip pan 24. This pan is adapted to catch any drippings from the carcasses as the latter are placed in suspended relation with the following rail section $r^1$ and is connected to what may be termed the rear end of the tank 9 so that the drippings flow back into the tank. After acquiring the seal-like coatings as a result of being dipped in the tank 9 the carcasses are moved along the rail section $r^1$ past a water spray 25 to a platform-type stripping point 26. The spray 25 is adapted to cool the coatings on the carcasses to approximately 140° F. At such temperature the coatings are in a plastic state and can readily be handled in connection with the stripping or peeling operation. A gutter 27 underlies the spray 25 and serves to catch and drain away the sprayed water. At the stripping point 26 the resinous coatings are stripped or peeled from the carcasses. Stripping is preferably done by several operators. The first operator generally passes both hands along the inner sides of the hind legs of the carcasses to the crotch in order to sever the upper portions of the coatings along the inner sides of the hind legs and then folds the coatings downwards. The next operator in line then pulls or folds the coatings further downwards along the body portions of the carcasses and other operators in the line complete removal of the coatings from the carcasses. When the coatings are removed hair and roots remaining on the carcasses after the machine dehairing operation and all glandular secretions and other undesirable matter are removed from the skin portions of the carcasses. As a result of the fact that the temperature of the material in the tank 9 is approximately 300° F. the moisture on and in the skins of the carcasses is transformed or changed into steam and this due to confinement within the seal-like coatings loosens the roots of the hair remaining on the carcasses and materially aids in elimination of the various glandular secretions in connection with stripping of the coatings from the carcasses.

The remelting tank 11 is disposed on the subfloor $f^1$ of the combined slaughtering and packing house H at a point directly beneath the platform-type stripping point 26 and comprises a cylindrical side wall 28 and a circular bottom 29 and embodies within the side wall a spiral inner steam pipe 30, a spiral intermediate pipe 31, and a spiral outer steam pipe 32. The top of the remelting tank is open and is adapted to receive the stripped coatings from stripping point 26 by way of a vertically extending conduit 33. The latter, as shown in Figure 1, extends through the main floor $f$ and is arranged so that the lower end thereof is directly over the tank 11. Angle iron legs 34 are applied to the bottom portion of the cylindrical side wall 28 and serve to hold the tank 11 in spaced relation with the sub-floor $f^1$. The spiral steam pipes 30, 31 and 32 are adapted to produce sufficient heat to melt the coatings and preferably maintain the remelted material at a temperature of approximately 325° F. Steam is introduced into the upper ends of the aforementioned pipe by way of a header 35. This header receives steam from any suitable source and is connected to the pipes 30, 31 and 32 by way of downwardly extending pipe sections 36, 37 and 38. The lower or discharge ends of the spiral steam pipes are connected by way of vertically extending pipes 39, 40 and 41 to a header 42 which is suitably connected to the return side of the steam producing system. In order to agitate the melted material so as to liberate the moisture accompanying the coatings and prevent the same from changing into steam and causing the remelted material to bubble over, the remelting tank 11 is provided with an agitator 43. The latter is in the form of a vertically extending shaft 44 which is centrally positioned in the tank and embodies a series of vertically spaced paddles 45. The lower end of the shaft is journaled in a bearing 46 which is mounted on a bracket 47 on the central portion of the tank bottom 29. The agitator is adapted to be driven by an electric motor 48. The latter is mounted on a bracket 49 on the outside of the side wall 28 of the remelting tank and is drivably connected to the upper end of the agitator shaft 44 by way of a chain and sprocket connection 50, a horizontally extending shaft 51, and a gear type speed reducing unit 52. The connection 50 comprises a sprocket 53 on the armature shaft of the motor 48, a sprocket 54 on one end of the shaft 51, and an endless chain 55 around these two sprockets.

Figure 6:
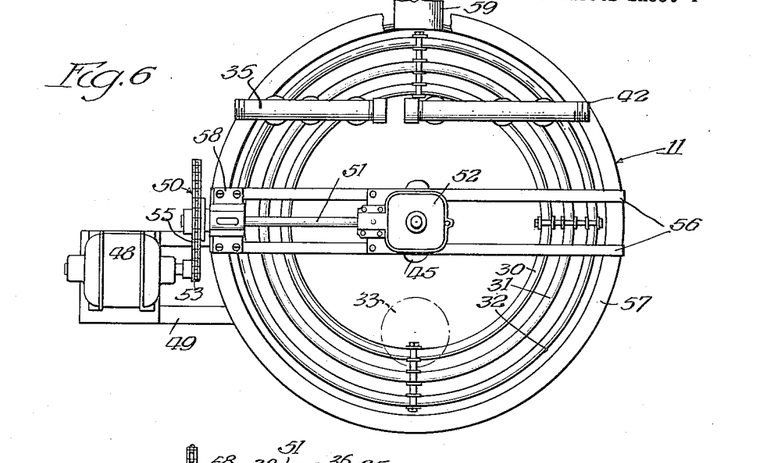
Figure 6 is a plan view of the remelting tank.
Figure 7:
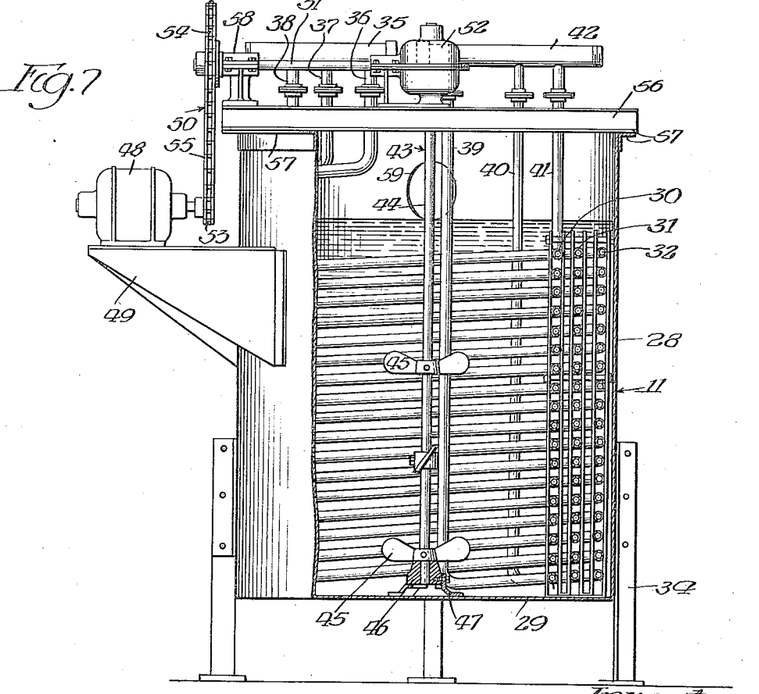
Figure 7 is a side elevation of the remelting tank with parts broken away and shown in section to illustrate the arrangement and design of the power driven agitator for liberating the moisture accompanying the coatings and preventing the mass of material from bubbling over during remelting thereof.

The gear type speed reducing unit 52 extends between, and serves drivably to connect, the other end of the shaft 51 and the upper end of the agitator shaft 44, and is mounted on a pair of laterally spaced channel beams 56. The latter, as shown in Figure 6 of the drawings, extend across the upper end of the cylindrical side wall 28 of the remelting tank and have their ends secured to an out-turned flange 57. The shaft 51 extends radially with respect to the tank and is journaled in a bearing 58 on the beams 56. When the remelting tank is in operation the stripped or peeled coatings which are delivered into the tank by way of the conduit 33 are melted as the result of contact with the steam pipes 30, 31 and 32. The material which is remelted in the tank 11 is kept constantly in motion by the agitator 43, with the result that the moisture adhering to the coatings is liberated and no steam tending to cause the material to bubble over is thus formed. The remelted material is discharged from the remelting tank 11 to the reclaiming tank 12 by way of a spout 59. This spout, as shown in Figure 1, extends downwardly from the upper portion of the cylindrical side wall 28 of the remelting tank into one end of the reclaiming tank 12. During operation of the apparatus the remelted material overflows from the remelting tank through the spout 59 into the reclaiming tank 12.

Figure 2:
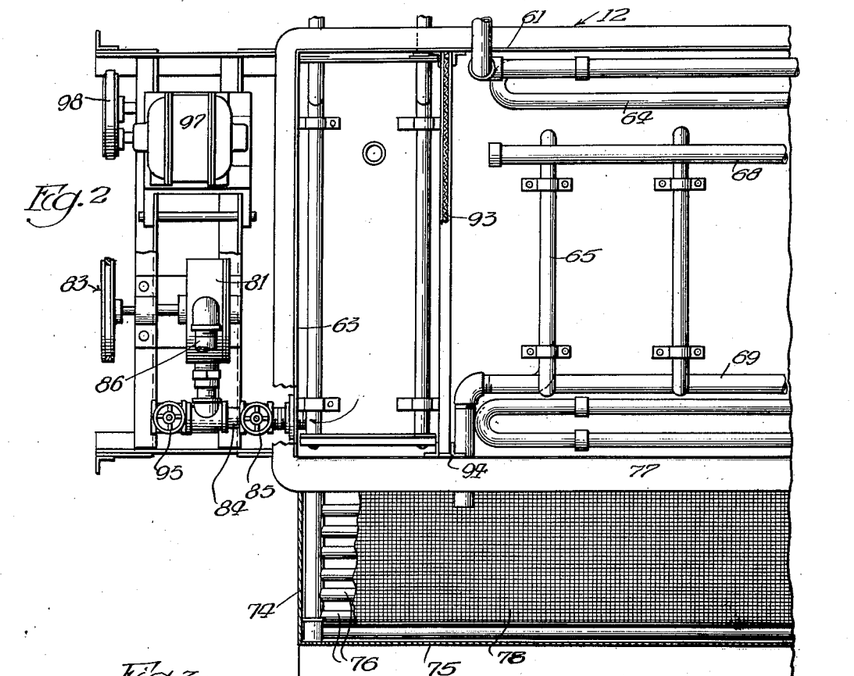
Figure 2 is a fragmentary plan view of the reclaiming tank of the two floor apparatus of Figure 1, that is, the tank wherein the remelted material is cleared of hair and other debris which are removed from the carcasses when the coatings are stripped or peeled therefrom.
Figure 3:
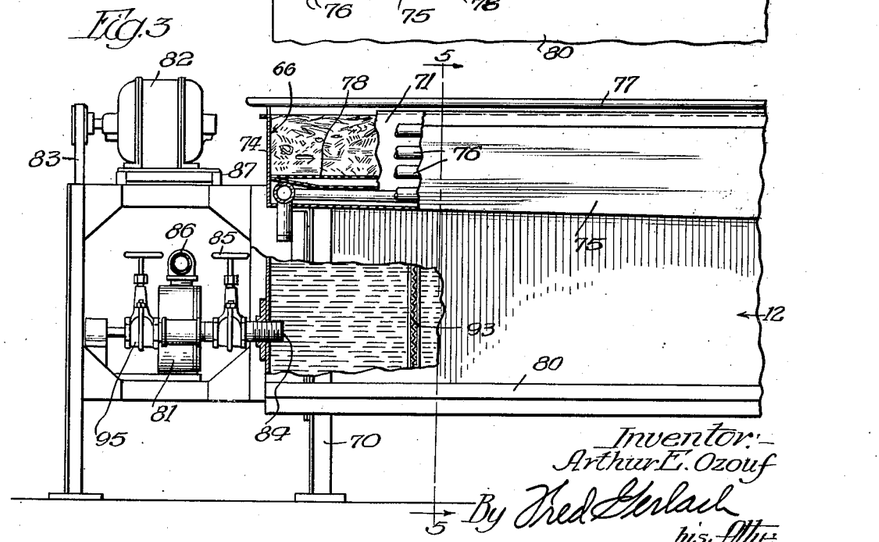
Figure 3 is a fragmentary front view of the reclaiming tank of Figure 2 with parts broken away and shown in section in order to illustrate the construction and design of the screen and trough which constitute the means for effecting removal of the hair and other debris from the remelted material.
Figure 4:
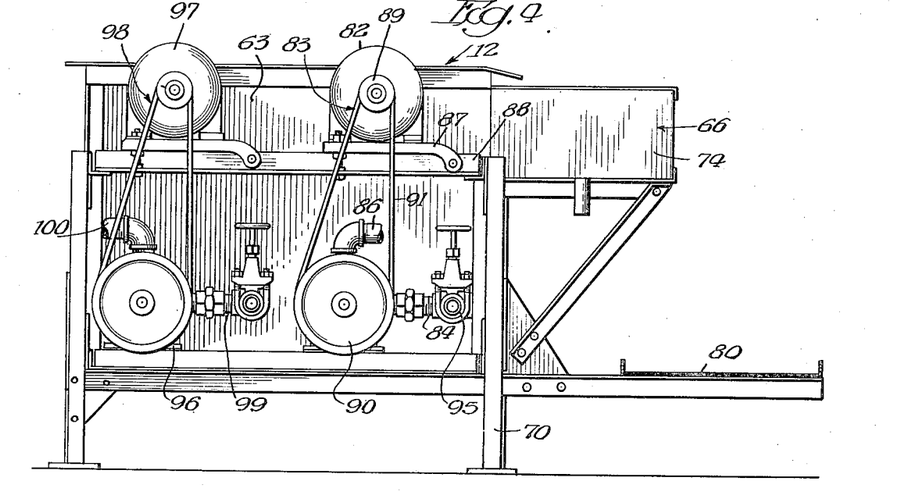
Figure 4 is an end view of the reclaiming tank.
Figure 5:
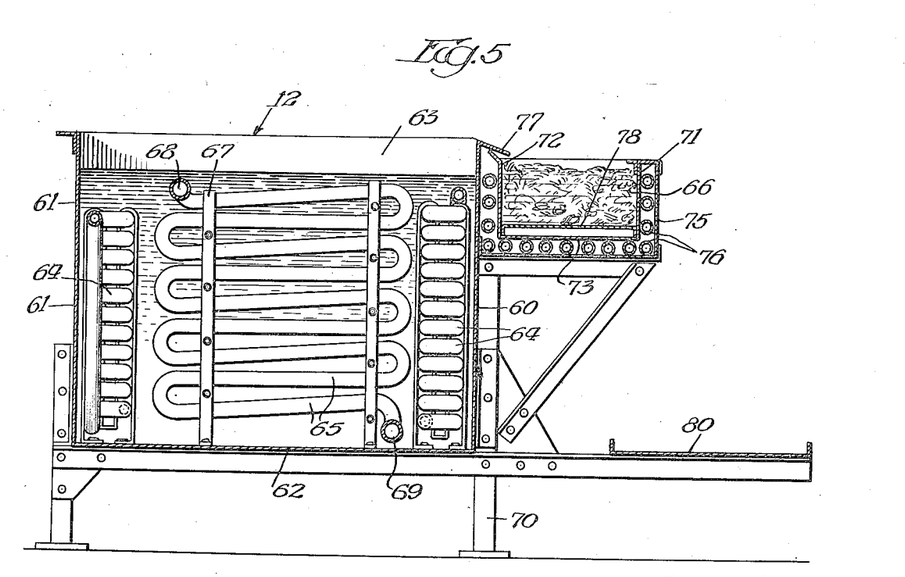
Figure 5 is a vertical transverse sectional view taken on the line 5—5 of Figure 3 and illustrating the arrangement of the steam coils which serve to maintain the remelted material in the reclaiming tank at the proper temperature for delivery or return to the dipping tank.

The reclaiming tank 12 is disposed on the sub-floor $f^1$ of the combined slaughtering and packing house H in close proximity to the remelting tank 11. It is elongated and consists of a front wall 60, a back wall 61, a bottom 62, and a pair of ends 63. In addition the reclaiming tank comprises a pair of laterally spaced steam coils 64, and a series of transversely extending steam coils 65, and a longitudinally extending trough 66. The coils 64 and 65 serve to keep the remelted material at a temperature of approximately 325° F. since at such temperature the material is in a liquid state or condition. The coils 64 are located inwards and extend lengthwise of the front and back walls 60 and 61 and are suitably connected for the flow of steam therethrough. The coils 65 extend between the coils 64, as shown in Figures 2 and 5, and are retained in place by way of brackets 67 which are connected to and extend upwards from the reclaiming tank bottom 62. Steam is introduced into the coils 65 by way of a longitudinally extending header 68 adjacent to the top of the tank 12. A header 69 is connected to the discharge ends of the coils 65 and serves as a return for the spent steam. The tank is supported from the sub-floor $f^1$ by way of a plurality of angle iron legs 70 which are suitably secured to the lower portions of the front and back walls 60 and 61. The trough 66 extends along and projects outwardly from the upper portion of the front wall 60 of the reclaiming tank and comprises front and rear walls 71 and 72, a bottom wall 73, and end walls 74. It is surrounded by a jacket 75, as shown in Figure 5, and is heated by way of a plurality or series of longitudinally extending steam pipes 76 in the space between the jacket and the front, back and bottom of the trough. The hair, cotton and other debris which are embedded in or adhere to the coatings after they are stripped from the hog carcasses tend to float and are adapted to be raked from the remelted material in the reclaiming tank into the trough 66. An out-turned flange 77 is formed as an integral part of the upper margin of the front wall 60 of the reclaiming tank and serves to direct or guide the raked hair, cotton and debris from the reclaiming tank proper into the trough. A screen 78 overlies and is spaced a small distance above the bottom 73 of the trough and serves as a strainer whereby the raked hair and other debris are maintained in the upper portion of the trough and the resinous material accompanying the hair and debris is permitted to drain onto the trough bottom 73. The latter is inclined and directs the strained material to a discharge spout 79 at one end of the trough. This spout is adapted to discharge into any suitable storage receptacle which when filled may be poured back into the dipping tank 9. The hair, cotton, and other debris which accumulate above the strainer forming screen 78 are adapted to be removed from the trough by way of a fork or other suitable implement. A platform 80 is suitably supported in front of the reclaiming tank and is adapted to support rake-equipped operators in front of the trough. The reclaimed remelted coating material is adapted to be returned to the dipping tank 9 by way of a pump 81. This pump is located at the end of the tank which is opposite to the spout 59 of the remelting tank and is driven by an electric motor 82 through the medium of a belt and pulley connection 83. The inlet side of the pump is connected to receive the material from the tank by way of a pipe connection 84 which extends through the adjacent tank end 63 and embodies a gate valve 85 for controlling the flow of the coating material through it into the pump. The pump outlet is connected to the dipping tank 9 by a pipe 86. This pipe extends upwards through the main floor f of the combined slaughtering and packing house H and leads to the top portion of the tank 9. The electric motor 82 for driving the pump is mounted on a pivoted bed-plate 87 on an angle bar support 88. The connection 83 comprises a pulley 89 on the armature shaft of the motor 82, a pulley 90 on the rotor shaft of the pump, and an endless belt 91 extending between and around the two pulleys. When current is supplied to the motor 82, the pump 90 is driven and operates to draw the remelted reclaimed material from the tank 12 and supply it under pressure through the pipe 86 into the dipping tank 9. In order to maintain the resinous coating material in the tank 9 at a constant level an overflow pipe 92 is provided. This pipe is of greater capacity than the pump 81 and leads downwards to the reclaiming tank 12 from the point at which the level of the material in the tank 9 is to be maintained. During operation of the coating apparatus, the dipping tank 9 is replenished with coating material from the tank 12 by way of the pump 81 and the level of the material in the tank is maintained constant as the result of the action of the overflow pipe 92. By maintaining the material in the tank 9 at a constant level the seal-like coatings on the hog carcasses are uniform. In order to prevent any hair or debris from passing from the tank 12 into the tank 9 a screen 93 is provided. This screen is disposed in front of the inlet end of the pipe connection 84 and extends transversely across the reclaiming tank 12. The side margins of the screen 93 fit in vertical guideways 94 which are mounted on the inner faces of the front and back walls of the reclaiming tank and permit the screen 93 to be removed when desired for cleaning purposes. By reason of the fact that the pump 81 is located at the end of the tank which is opposite the discharge spout 59 and the screen 93 is employed there is no likelihood of any hair, cotton or other debris being pumped into the dipping tank. The pipe connection 84 includes a valve controlled section 95 which is adapted when opened to permit of drainage of the tank 9 by a reverse drive of the pump 81. In order to prevent failure or breakage of the pump 81 from stopping operation of the apparatus, a second pump 96 is provided. This pump is located alongside of the pump 81 and is driven by means of an electric motor 97 through the medium of a belt and pulley connection 98. It is connected to the reclaiming tank 12 by a valve controlled pipe connection 99 and its discharge end communicates with the tank 9 by way of a pipe 100.

Assuming that the carcass dipping mechanism 10, the agitator 43, and the pump 81 are in operation and that the tanks 9, 11 and 12 are properly or duly heated by their respective steam pipes or coils, the operation of the apparatus is as follows: The hog carcasses after being subjected to the action of the dehairing machine and while supported on the gambrel equipped trolleys T are moved one at a time onto the discharge end of the preceding rail section r. From this end of the section r the carcasses are picked up by the hook equipped cross shafts of the endless conveyor 16 and are first lowered into the tank 9 and are then elevated from the tank and placed in suspended relation with the receiving end of the following rail section $r^1$ of the overhead rail R. When immersed in the resinous material in the tank 9 the carcasses acquire a seal-like coating, as hereinbefore described. After placement on the receiving end of the rail section $r^1$ the carcasses are moved past the spray 25 and then to the coating stripping point 26. During travel of the carcasses past the spray the resinous coatings are cooled to a plastic state as the result of the action of the water. At the stripping point 26 the coatings are stripped from the carcasses, as hereinbefore described, in order to effect removal of the hair and roots remaining on the skins of the carcasses as well as removal of glandular secretions and other undesirable matter. After stripping or peeling from the carcasses the coatings are dropped through the conduit 33 into the remelting tank 11. In this tank the coatings are melted and the remelted material, as hereinbefore pointed out, is subjected to the action of the agitator 43 which liberates the moisture accompanying the coatings and prevents any steam formation which is likely to cause bubbling-over of the material. From the remelting tank 11 the remelted material overflows through the spout 59 into the reclaiming tank 12. In this tank 12 the hair, cotton and other debris are raked from the material into the trough 66, where they are separated from any adhering resinous material by the straining action of the screen 78 over the trough bottom 73. After being cleared of the aforementioned debris the remelted material flows through the screen 93 and is pumped by the pump 81 through the pipe 86 back to the dipping tank 9. As a result of the action of the overflow pipe 92 and constant pumping of the pump 81 the melted resinous coating material in the tank 9 is maintained at all times at a constant or uniform level. When it is desired to drain the tank 9 the valve of the valve-controlled section 95 is opened and the pump 81 is reversely driven. The material in the remelting tank 12 is maintained at approximately a temperature of 325° F. in order to compensate for any loss of heat of the material during flow to the dipping tank 9 through the pipe 86. The pump 81 and the overflow pipe 92 leading from the dipping tank to the reclaiming tank 12 constitute means for maintaining constancy of level of the resinous material in the tank 9.

Figure 8:
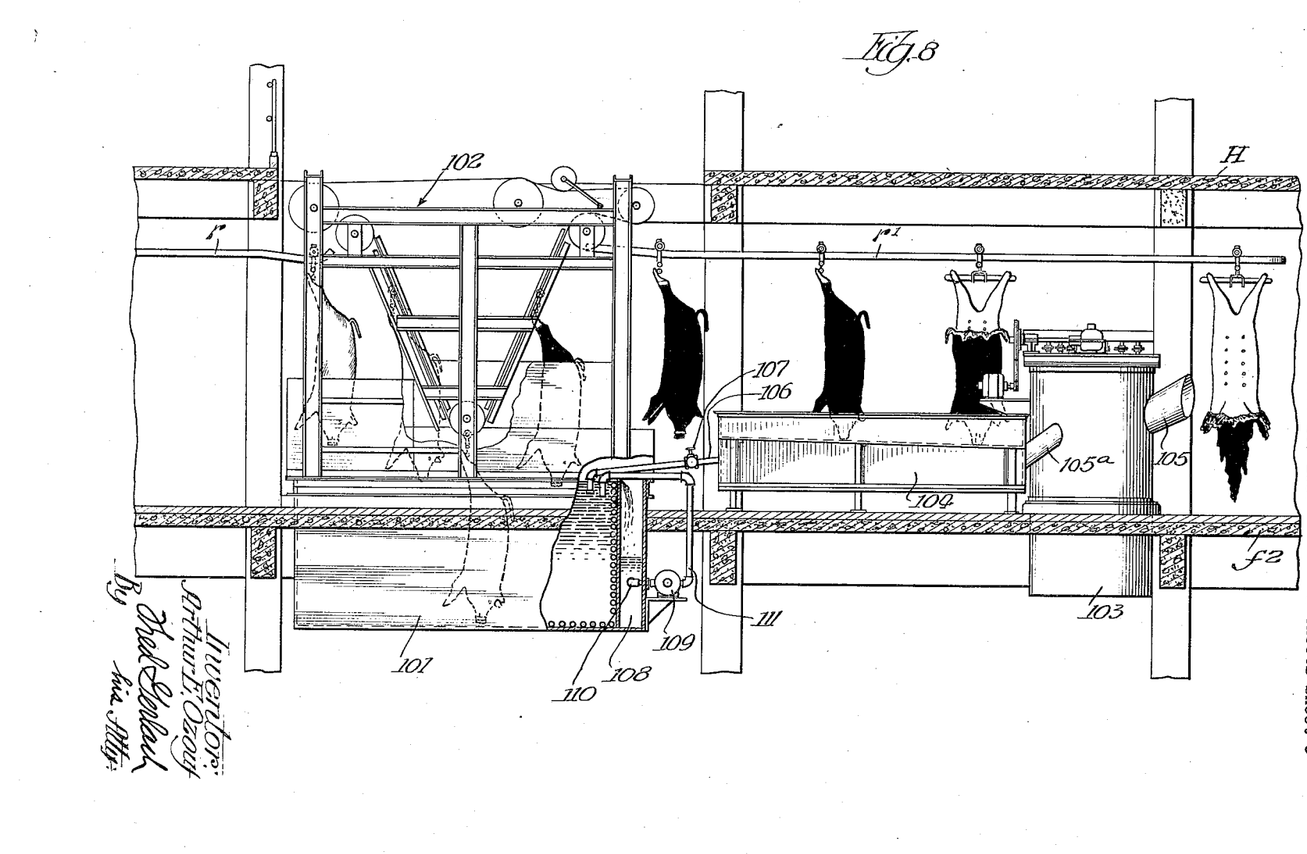
Figure 8 is a view partly in section and partly in side elevation of a one floor carcass coating apparatus constituting another form of the invention.

The coating apparatus which is shown in Figure 8 constitutes another or second embodiment of the invention and is illustrated in connection with a combined slaughtering and packing house having a single floor $f^2$. It operates similarly to, and serves the same purpose as, the two floor apparatus of Figures 1 to 7 inclusive, and comprises a dipping tank 101, a carcass dipping mechanism 102, a remelting tank 103, and a reclaiming tank 104. The dipping tank is mounted in the floor $f^2$ and is suitably heated to maintain in a melted condition a column or mass of material for coating purposes. The remelting tank 103 is substantially the same in design and construction as the remelting tank 11. It is disposed beneath the following rail section $r^1$ and has a side pipe 105 whereby the stripped or peeled coatings may be introduced into it for remelting purposes. The reclaiming tank 104 is mounted on the floor $f^2$ and extends between the remelting tank 103 and the dipping tank 101. It is the same in design and construction as the reclaiming tank 12 of the two floor coating apparatus, serves as a medium for effecting removal of the hair, cotton and other debris which is found in the remelted material, and is connected to receive the remelted material from the remelting tank 103 by way of a pipe 105a. The remelted or reclaimed material is delivered into the dipping tank 101 by way of a pipe 106. This pipe is connected to one end of the reclaiming tank 104 and leads downwards to the tank 101. It embodies a control valve 107 which when opened permits the remelted and reclaimed material in the tank 104 to flow by gravity into the tank 101. The valve 107 is adapted normally to remain closed and to be opened only when it is necessary to replenish the supply of resinous coating material in the tank 101. The dipping tank 101 is provided at one end thereof with an overflow chamber 108. The material in the tank is adapted to spill or overflow into this chamber when the proper dipping level is reached. A motor driven pump 109 is connected to the chamber 108 by way of a pipe connection 110 and is adapted to pump the overflow material in the chamber 108 back into the tank 101 via a pipe 111. The pump 101 is adapted to be constantly driven during operation of the apparatus of Figure 8 with the result that a constant level of the material is maintained in the tank 101. When the amount of material in the chamber 108 runs low or drops to a point immediately above the inlet end of the pipe connection 110 more material is admitted into the tank 101 from the reclaiming tank 104 by way of the valve controlled pipe 106.

The two hereinbefore described embodiments of the invention operate in an efficient manner and are not only practical but also perform their intended purpose with but a minimum loss of the coating material.

The invention is not to be understood as restricted to the details set forth, since these may be modified within the scope of the appended claims, without departing from the spirit and scope of the invention.

Having thus described the invention what I claim as new and desire to secure by Letters Patent is:

1. In an apparatus of the character described, the combination of a dipping tank containing a mass of readily congealable coating material and having heating means for maintaining the material in a melted condition, means associated with the tank for dipping animal carcasses in the mass in order to form coatings thereon which upon removal after becoming plastic rid the carcasses of hair and other matter, a remelting tank adapted to receive the coatings after removal from the carcasses and melt them into a mass of remelted material, a reclaiming tank connected to receive the reclaimed material from the remelting tank and provided with means for effecting removal of the hair and other matter from said material, and means for delivering the material from the reclaiming tank to the dipping tank for reuse.

2. In an apparatus of the character described, the combination of means for applying readily congealable material in a melted condition to carcasses in order to form coatings thereon which upon removal after becoming plastic rid the carcasses of hair and other matter, a remelting tank adapted to receive the coatings after removal from the carcasses and melt them into a mass of remelted material, a reclaiming tank with heating means therefor, connected to receive the remelted material from the remelting tank and provided with means for effecting removal of the hair and other matter from the remelted material, and means for delivering the material from the reclaiming tank to the applying means.

3. In an apparatus of the character described, the combination of a dipping tank containing a mass of readily congealable material and having heating means for maintaining the material in a melted condition, means associated with the dipping tank for dipping animal carcasses in the mass in order to form coatings thereon which upon removal after becoming plastic rid the carcasses of hair and other matter, a remelting tank adapted to receive the coatings after removal from the carcasses and remelt them into a mass of remelted material and provided with an agitator for liberating any moisture adhering to the coatings during melting of the latter, a reclaiming tank connected to receive the reclaimed material from the remelting tank and provided with means for effecting removal of the hair and other matter from said material, and means for delivering the material from the reclaiming tank to the dipping tank for reuse.

4. In an apparatus of the character described, the combination of means for applying readily congealable adhesive material in a melted condition to animal carcasses in order to form coatings thereon which upon removal after becoming plastic rid the carcasses of hair and other matter, a remelting tank adapted to receive the coatings after removal from the carcasses and remelt them into a mass of remelted material and provided with an agitator for liberating any moisture adhering to the coatings during melting of the latter, a reclaiming tank with heating means therefor connected to receive the remelted material from the remelting tank and provided with means for effecting removal of the hair and other matter from the remelted material, and means for delivering the material from the reclaiming tank back to the applying means for reuse.

5. In an apparatus of the character described, the combination of a dipping tank containing a mass of readily congealable material and having heating means for maintaining the material in a melted condition, means associated with the dipping tank for dipping carcasses in the mass in order to form coatings thereon which upon removal after becoming plastic rid the carcasses of hair and other matter, a remelting tank adapted to receive the coatings after removal from the carcasses and melt them into a mass of remelted material, a reclaiming tank connected to receive the remelted material from the remelting tank and provided with a trough at one side thereof into which the hair and other matter may be raked, and means for delivering the material from the reclaiming tank back to the dipping tank for reuse.

6. In an apparatus of the character described, the combination of a dipping tank containing a mass of readily congealable material and having heating means for maintaining the material in a melted condition, means associated with the dipping tank for dipping carcasses in the mass in order to form coatings thereon which upon removal after becoming plastic rid the carcasses of hair and other matter, a remelting tank adapted to receive the coatings after removal from the carcasses and melt them into a mass of remelted material, a reclaiming tank connected to receive the remelted material from the remelting tank and provided at one side thereof with a screen equipped trough into which the hair and other matter in the remelted material may be raked, and means for delivering the material from the reclaiming tank back to the dipping tank and maintaining the mass of material in the last mentioned tank at a constant level.

7. In an apparatus of the character described, the combination of a dipping tank containing a mass of readily congealable material and having heating means for maintaining the material in a melted condition, means associated with the dipping tank for dipping carcasses in the mass in order to form coatings thereon which upon removal after becoming plastic rid the carcasses of hair and other matter, a remelting tank adapted to receive the coatings after removal from the carcasses and melt them into a mass of remelted material and provided with a power driven agitator for liberating any moisture adhering to the coatings during melting of the latter, a reclaiming tank with heating means therefor, connected to receive the remelted material from the remelting tank and provided at one side thereof with a trough into which the hair and other matter in the remelted material may be raked, and means for delivering the material from the reclaiming tank back to the dipping tank for reuse.

8. The combination with a building structure having an upper and a lower floor, of a dipping tank with a mass of readily congealable material therein mounted in the upper floor and having heating means for maintaining the material in a melted condition, means over said upper floor and associated with the dipping tank for dipping animal carcasses in the mass in order to form coatings thereon which upon removal after becoming plastic rid the carcasses of hair and other matter, a conduit extending through said upper floor for conducting the coatings toward the lower floor after removal from the carcasses, means including a tank under the conduit and on said lower floor for melting the removed coatings and effecting removal of the hair and other matter from the remelted material, and pump means for delivering the remelted material back to the dipping tank for reuse.

9. The combination with a building structure having an upper and a lower floor, of a dipping tank with a mass of readily congealable material therein mounted in the upper floor and having heating means for maintaining the material in a melted condition, means over said upper floor and associated with the dipping tank for dipping animal carcasses in the mass in order to form coatings thereon which upon removal after becoming plastic rid the carcasses of hair and other matter, a conduit extending through said upper floor for conducting the coatings toward the lower floor after removal from the carcasses, a remelting tank mounted on the lower floor so as to receive the removed coatings from the conduit and adapted to melt the coatings and form them into a mass of remelted material, a reclaiming tank on the said lower floor in proximity to the remelting tank, connected to receive the remelted material from said remelting tank and provided with means for effecting removal of the hair and other matter from the remelted material, and pump means for delivering the material from the reclaiming tank back to the dipping tank for reuse.

10. In an apparatus of the character described, the combination of a dipping tank containing a mass of readily congealable adhesive coating material and having heating means for maintaining the material in a melted condition, means associated with the tank for dipping animal carcasses in the mass in order to form coatings thereon which upon removal after becoming plastic rid the carcasses of hair and other matter, means including a tank at a higher level than the dipping tank for melting the coatings after removal from the carcasses and effecting removal of the hair and other matter from the remelted material, a valve controlled pipe leading from the second mentioned tank to the dipping tank for conducting by gravity the remelted material from the former to the latter, and means for maintaining the mass of material in the dipping tank at a constant level including an overflow chamber at one end of the dipping tank and a pump for pumping overflow material from said chamber back to the dipping tank.

11. In an apparatus of the character described, the combination of a dipping tank containing a mass of readily congealable material and having heating means for maintaining the mass in a melted condition, means associated with the dipping tank for dipping animal carcasses in the mass in order to form coatings thereon which upon removal after becoming plastic rid the carcasses of hair and other matter, a remelting tank adapted to receive the coatings after removal from the carcasses and melt them into a mass of remelted material and provided with a power driven agitator for liberating any moisture adhering to the coatings after remelting of the latter, a reclaiming tank in proximity to the remelting tank and at a higher elevation than the dipping tank connected to receive the remelted material from said remelting tank and having means to effect removal of the hair and said other matter from the remelted material, a valve controlled pipe leading from the reclaiming tank downwards to the dipping tank for conducting by gravity the remelted material from the reclaiming tank to said dipping tank, and means for maintaining the mass of material in the dipping tank at a constant level including an overflow chamber at one end of the dipping tank and a pump for pumping overflow material from said chamber back to the dipping tank.

12. In an apparatus of the character described, the combination of means for applying readily congealable material in a melted condition to animal carcasses in order to form coatings thereon which upon removal after becoming plastic rid the carcasses of hair and other matter, a remelting tank adapted to receive the coatings after removal from the carcasses and remelt them into a mass of remelted material and provided with a power driven agitator for liberating any moisture on the coatings during melting of the latter, means for removing the hair and other matter from the remelted material, and means for delivering the remelted material to the applying means after removal of said hair and other matter from said material.

13. In an apparatus of the character described, the combination of means for applying readily congealable material in a melted condition to animal carcasses in order to form coating thereon which upon removal after becoming plastic rid the carcasses of hair and other matter, a remelting tank adapted to receive the coatings after removal from the carcasses and melt them into a mass of remelted material, a reclaiming tank adapted to receive the remelted material from the remelting tank and provided with a trough at one side thereof into which the hair and other matter may be raked, and means for delivering the material from the reclaiming tank to the applying means for reuse.

14. In an apparatus of the character described, the combination of means for applying readily congealable material in a melted condition to animal carcasses in order to form coatings thereon which upon removal after becoming plastic rid the carcasses of hair and other matter, means for remelting the coatings after removal from the carcasses and for reclaiming the material comprising a reclaiming tank provided at one side thereof with a trough into which the hair and other matter may be raked, and means for delivering the material from said reclaiming tank back to the applying means for reuse.

ARTHUR E. OZOUF.